(12) United States Patent
Tatat

(10) Patent No.: US 8,498,509 B2
(45) Date of Patent: Jul. 30, 2013

(54) OPTICAL FIBER TELECOMMUNICATION CABLE

(75) Inventor: Olivier Tatat, Sangatte (FR)

(73) Assignee: Draka Comteq B.V., Amsterdam (NL)

(*) Notice: Subject to any disclaimer, the term of this patent is extended or adjusted under 35 U.S.C. 154(b) by 340 days.

(21) Appl. No.: 12/466,965

(22) Filed: May 15, 2009

(65) Prior Publication Data

US 2009/0297107 A1    Dec. 3, 2009

(30) Foreign Application Priority Data

May 16, 2008    (FR) ...................................... 08 02656

(51) Int. Cl.
*G02B 6/44* (2006.01)

(52) U.S. Cl.
USPC ............ 385/109; 385/100; 385/113; 385/114

(58) Field of Classification Search
USPC ......................................................... 385/114
See application file for complete search history.

(56) References Cited

U.S. PATENT DOCUMENTS

| | | | |
|---|---|---|---|
| 4,401,361 A | 8/1983 | Slaughter | |
| 4,420,220 A | 12/1983 | Dean et al. | |
| 4,815,814 A * | 3/1989 | Ulijasz | ........................... 385/114 |
| 4,838,643 A | 6/1989 | Hodges et al. | |
| 5,155,789 A | 10/1992 | Le Noane et al. | |
| 5,574,816 A | 11/1996 | Yang et al. | |
| 5,671,312 A | 9/1997 | Jamet | |
| 5,717,805 A | 2/1998 | Stulpin | |
| 5,761,362 A | 6/1998 | Yang et al. | |
| 5,911,023 A | 6/1999 | Risch et al. | |
| 5,982,968 A | 11/1999 | Stulpin | |
| 6,035,087 A | 3/2000 | Bonicel et al. | |
| 6,066,397 A | 5/2000 | Risch et al. | |
| 6,085,009 A | 7/2000 | Risch et al. | |
| 6,134,363 A | 10/2000 | Hinson et al. | |
| 6,175,677 B1 | 1/2001 | Yang et al. | |
| 6,181,857 B1 | 1/2001 | Emeterio et al. | |
| 6,210,802 B1 | 4/2001 | Risch et al. | |
| 6,215,931 B1 | 4/2001 | Risch et al. | |
| 6,314,224 B1 | 11/2001 | Stevens et al. | |
| 6,321,012 B1 | 11/2001 | Shen | |
| 6,321,014 B1 | 11/2001 | Overton et al. | |
| 6,334,016 B1 | 12/2001 | Greer, IV | |
| 6,381,390 B1 | 4/2002 | Hutton et al. | |

(Continued)

FOREIGN PATENT DOCUMENTS

| | | |
|---|---|---|
| EP | 0569679 A1 | 11/1993 |
| EP | 1052533 A1 | 11/2000 |

(Continued)

OTHER PUBLICATIONS

U.S. Appl. No. 12/098,804, filed Apr. 7, 2008, pp. 1-42 [Cited in Specification].

(Continued)

*Primary Examiner* — Hemang Sanghavi
(74) *Attorney, Agent, or Firm* — Summa, Additon & Ashe, P.A.

(57) ABSTRACT

The invention relates to a flat telecommunication cable in which optical fibers are positioned within micromodules. The micromodules are coupled to a surrounding, ribbon-like cable jacket, thereby preventing the micromodules from sagging within the cable during vertical installations. The invention also relates to a method of extracting optical fibers from such a cable.

20 Claims, 2 Drawing Sheets

U.S. PATENT DOCUMENTS

| | | | |
|---|---|---|---|
| 6,493,491 B1 * | 12/2002 | Shen et al. | 385/113 |
| 6,522,814 B2 * | 2/2003 | Yoshida et al. | 385/100 |
| 6,603,908 B2 | 8/2003 | Dallas et al. | |
| 6,618,538 B2 | 9/2003 | Nechitailo et al. | |
| 6,658,184 B2 | 12/2003 | Bourget et al. | |
| 6,718,101 B2 | 4/2004 | Le Noane et al. | |
| 6,749,446 B2 | 6/2004 | Nechitailo | |
| 6,847,767 B2 * | 1/2005 | Hurley et al. | 385/101 |
| 6,912,347 B2 | 6/2005 | Rossi et al. | |
| 6,922,515 B2 | 7/2005 | Nechitailo et al. | |
| 6,941,049 B2 | 9/2005 | Risch et al. | |
| 7,045,010 B2 | 5/2006 | Sturman, Jr. | |
| 7,162,128 B2 | 1/2007 | Lovie et al. | |
| 7,272,282 B1 * | 9/2007 | Seddon et al. | 385/106 |
| 7,322,122 B2 | 1/2008 | Overton et al. | |
| 7,346,244 B2 | 3/2008 | Gowan et al. | |
| 7,356,234 B2 | 4/2008 | de Montmorillon et al. | |
| 7,483,613 B2 | 1/2009 | Bigot-Astruc et al. | |
| 7,515,795 B2 | 4/2009 | Overton et al. | |
| 2002/0122639 A1 | 9/2002 | Le Noane et al. | |
| 2007/0127878 A1 | 6/2007 | de Montmorillon et al. | |
| 2007/0183726 A1 | 8/2007 | Nothofer et al. | |
| 2007/0212005 A1 * | 9/2007 | Lu et al. | 385/100 |
| 2007/0263964 A1 * | 11/2007 | Cody et al. | 385/100 |
| 2007/0280615 A1 | 12/2007 | de Montmorillon et al. | |
| 2008/0037942 A1 | 2/2008 | Tatat | |
| 2008/0080820 A1 * | 4/2008 | Andrews et al. | 385/101 |
| 2008/0145010 A1 | 6/2008 | Overton et al. | |
| 2008/0152288 A1 | 6/2008 | Flammer et al. | |
| 2008/0181564 A1 | 7/2008 | Overton et al. | |
| 2008/0292262 A1 | 11/2008 | Overton et al. | |
| 2009/0003779 A1 | 1/2009 | Parris | |
| 2009/0003781 A1 | 1/2009 | Parris et al. | |
| 2009/0003785 A1 | 1/2009 | Parris et al. | |
| 2009/0041414 A1 | 2/2009 | Lavenne et al. | |
| 2009/0175583 A1 | 7/2009 | Overton | |
| 2009/0214167 A1 | 8/2009 | Lookadoo et al. | |
| 2009/0252469 A1 | 10/2009 | Sillard et al. | |
| 2009/0279835 A1 | 11/2009 | de Montmorillon et al. | |
| 2009/0279836 A1 | 11/2009 | de Montmorillon et al. | |
| 2009/0297107 A1 | 12/2009 | Tatat | |
| 2010/0266249 A1 | 10/2010 | Bonicel et al. | |
| 2010/0290781 A1 | 11/2010 | Overton et al. | |

FOREIGN PATENT DOCUMENTS

| | | |
|---|---|---|
| EP | 1921478 A1 | 5/2008 |
| EP | 2120077 A1 | 11/2009 |
| FR | 2665266 A1 | 1/1992 |
| FR | 2706218 A1 | 12/1994 |
| FR | 2901890 A1 | 12/2007 |
| WO | 01/98810 A1 | 12/2001 |
| WO | 2007/013923 A2 | 2/2007 |
| WO | 2009/062131 A1 | 5/2009 |

OTHER PUBLICATIONS

European Search Report in counterpart European Application No. 09006587 dated Jul. 27, 2009, pp. 1-5.

French Search Report in counterpart French Application No. 0802656 dated Nov. 3, 2008, pp. 1-6.

European Office Action in counterpart European Application No. 09006587.1 dated Jun. 6, 2012, pp. 1-5 [All references previously cited].

* cited by examiner

OPTICAL FIBER TELECOMMUNICATION CABLE

CROSS-REFERENCE TO PRIORITY APPLICATION

This application claims the benefit of pending French Application No. 08/02656 for "Optical Fiber Telecommunication Cable" (filed May 16, 2008, at the French Patent Office), which is hereby incorporated by reference in its entirety.

FIELD OF THE INVENTION

The present invention relates to a telecommunication cable in which a plurality of optical fibers is grouped in a plurality of micromodules. The present invention also relates to method for extracting the optical fibers from such a telecommunication cable.

BACKGROUND OF THE INVENTION

Optical fiber cables having optical-fiber modules are known from French Patent No. 2,665,266 (and its counterpart U.S. Pat. No. 5,155,789) and French Patent No. 2,706,218 (and its counterpart U.S. Pat. No. 5,671,312). Each of these patents is each hereby incorporated by reference in its entirety.

A conventional telecommunication cable can include a plurality of optical fibers that are grouped in modules to form a cable core (i.e., within the central cavity formed by the cable jacket). A module can contain between about 2 and 24 optical fibers that are enveloped in a thin, flexible retaining enclosure (i.e., the module's jacket). Such retaining enclosures and the enclosed optical fibers can be colored to facilitate identification of the optical fibers (e.g., during a connection operation).

With the development of optical fiber telecommunication systems to the subscriber (e.g., FTTH—"Fiber-To-The-Home" or FTTC—"Fiber-To-The-Curb"), high-capacity cables containing a large number of optical fibers grouped in modules are sought. Such cables must allow access to each module for distribution not only into a particular building but also into a particular floor within that building. To this end, operators carry out a dropping operation on the telecommunication cable in which an opening is made in the cable and one or more modules are withdrawn in order to supply a signal to a given optical system.

International Publication No. WO 01/98810 A1 (and its counterpart U.S. Pat. No. 6,718,101), each of which are hereby incorporated by reference in its entirety, describe an ovalized optical cable with continuous accessibility. The disclosed cable, which is suitable for subscriber local loops and inside cabling, includes a protective jacket receiving optical-fiber modules. The disclosed cable can accommodate approximately 12 to 96 optical fibers, which are arranged in the cable so as to occupy much of the cavity along the cavity's major axis but to leave significant clearance in the cavity's minor axis. This clearance allows variations in the overlength of the fibers within the cable. Reinforcing elements are positioned within the protective jacket on either side of the cavity along the cavity's major axis. The cable can be wound onto a cable drum or bent during installation in a conduit along the cavity's major axis, thus taking advantage of the significant clearance in the cavity's minor axis. The optical-fiber modules are loosely positioned within the cavity, allowing stresses to be eliminated during extension of the cable jacket under a certain tension or under the effect of thermal expansion or contraction. The cable jacket includes markings (e.g., colored threads, fracture initiators, or regions of lower thickness) to indicate the regions where windows could be cut for dropping operations. A first access window can thus be opened to cut a given module and a second access window can be opened to extract the selected module.

U.S. Pat. No. 7,272,282, which is hereby incorporated by reference in its entirety, describes a flat cable in which optical fibers are freely positioned in buffer tubes, which are loosely arranged in a ribbon-like array in the cable. Although the buffer tubes can be extracted from the cable, extracting fibers from the buffer tubes would subject the optical fibers to unwanted stresses. Moreover, the extraction of optical fibers from the cable would require a cutting tool.

European Patent Application No. 0,569,679 A1, which is hereby incorporated by reference in its entirety, discloses a flat cable having optical fibers freely positioned in metal tubes. Although this publication does not describe the manner in which the fibers would be extracted during a dropping operation, access to the optical fibers through the metal tubes would be difficult.

When the foregoing conventional cables are vertically positioned, however, the constituent modules sag within the cable. This can cause buckling of the micromodules below and corresponding tension upon the micromodules above. These effects can cause unwanted attenuation. In addition, the optical fibers can be subjected to mechanical strains at the dropping points, thereby further increasing attenuation.

Therefore, a need exists for a cable having optical-fiber micromodules that can be installed vertically without the micromodules sagging within the cable and which facilitates easy dropping of the optical fibers.

SUMMARY OF THE INVENTION

Accordingly, in one aspect the invention embraces a flat optical fiber telecommunication cable (e.g., a riser cable) that includes a plurality of micromodules arranged in a sheet-like formation (i.e., substantially planar in parallel). Each of the micromodules has a retaining enclosure (i.e., a sheath) that surrounds a plurality of optical fibers, as well as a greasy component (e.g., synthetic or mineral oil-based filling gels) that is applied between the optical fibers. A cable jacket is extruded over the micromodules so that the micromodules are coupled to the cable jacket. For example, the cable jacket is typically extruded tightly onto the respective micromodule sheaths so that the micromodules are encapsulated within the cable jacket. The cable jacket may be formed from halogen-free, flame-retardant (HFFR) materials or polyvinyl chloride (PVC). The cable can further include reinforcing elements positioned within the cable jacket on each outermost side of the plurality of micromodules.

In another aspect, the invention embraces a related method for dropping optical fibers from the foregoing cable without removing a micromodule from the cable. A first opening is made in the cable jacket, one or more micromodules is accessed, and the optical fibers enclosed therein are cut. Then, a second opening is made in the cable jacket, the one or more micromodules is accessed, and the cut optical fibers are pulled out of the one or more micromodules through the second opening. In multi-story buildings, the first opening can also serve as the extraction point for other optical fibers as disclosed herein.

The foregoing, as well as other characteristics and advantages of the invention and the manner in which the same are accomplished, are further specified within the following detailed description and its accompanying drawings.

DETAILED DESCRIPTION

In one aspect, the invention embraces a flat optical fiber telecommunication cable (e.g., an indoor riser cable) that includes a plurality of optical-fiber micromodules in a side-by-side arrangement (i.e., parallel to one another in the form of a ribbon). The optical fibers contained within the micromodules not only are continuously accessible but also can be extracted from the flat cable without requiring the extraction of the corresponding micromodules.

As will be appreciated by those having ordinary skill in the art, a flat cable is used herein to refer to a cable in which the optical-fiber micromodules are positioned side-by-side. Unlike cylindrical cables, flat cables facilitate access to each constituent micromodule. Unlike other flat cables, the present flat cable employs optical-fiber micromodules that permit the ready extraction of the optical fibers from the micromodules without requiring sharp cutting tools.

Each micromodule of the present cable includes a flexible, thin retaining enclosure (i.e., a microcable sheath) that surrounds a plurality of optical fibers and, optionally, a greasy component, which is present between the optical fibers. In this regard, the greasy component facilitates the extraction of the optical fibers from the micromodule as herein described.

The cable jacket is extruded ribbon-like over micromodules. The cable jacket contacts each microcable sheath, thereby longitudinally connecting each microcable sheath with the cable jacket without placing excessive stresses upon the micromodules (and the constituent optical fibers). Consequently, the micromodules are coupled to the cable jacket and cannot slide within the cable, even if the cable is installed vertically.

In accordance with the present invention, the optical fibers may be directly extracted from the cable rather than extracting an entire micromodule as is conventionally required. To achieve this, a first opening is made in the cable jacket, at which point the retaining enclosure of at least one micromodule is accessed (e.g., torn or otherwise opened), and the enclosed optical fibers are cut. A second opening is then made in the cable jacket, whereupon the micromodule is opened, and all the severed optical fibers are extracted. As noted, the greasy component acts as a lubricant to ease the the extraction of the optical fibers from the micromodule.

Figure 1:
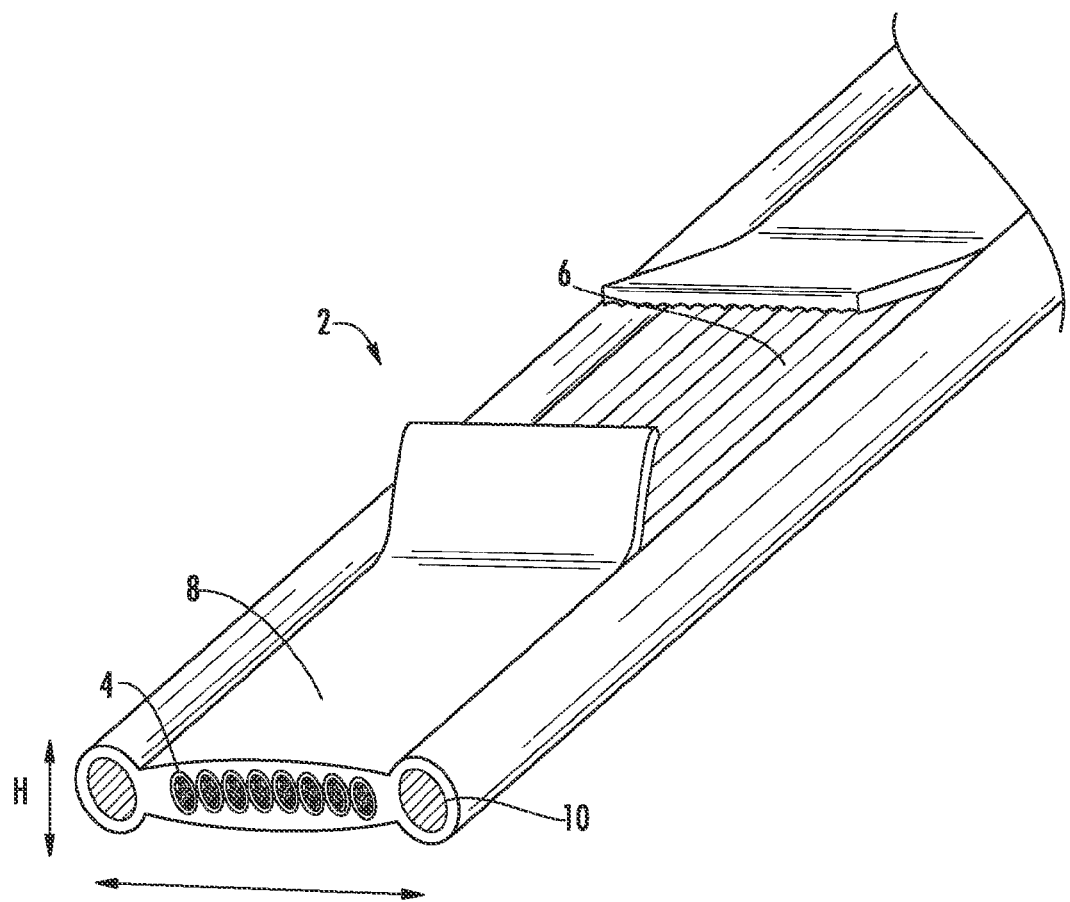
FIG. 1 schematically depicts a flat cable according to the present invention.

FIG. 1 illustrates an exemplary flat cable. As depicted in FIG. 1, a portion of the cable jacket is pulled away for purposes of illustration.

The cable 2 includes a plurality of micromodules 6, each micromodule 6 surrounding at least one optical fiber 4. In this particular example, eight micromodules 6 are represented, enclosing each comprising six optical fibers 4. The cable 2 thus includes 48 optical fibers though other fiber counts are certainly within the scope of the present invention.

A greasy component (not shown) is applied to the optical fibers 4 manufacture of the micromodule 6. For example, the optical fibers 4 can be immersed in a grease bath just before being assembled for extrusion of the micromodule's retaining enclosure (i.e., the micromodule sheath). The greasy component can be a filling gel, the main function of which is to ensure longitudinal water-tightness of the optical-fiber micromodules 6. Suitable filling gels are based on synthetic polyalphaolefins (PAO), polyisobutylene (POB), or mineral oils. The greasy component helps the optical fibers 4 to slide within the micromodule 6 when pulled. In this way, dropping of optical fibers 4 contained in a micromodule 6 can be obtained over a length of approximately 3 to 5 meters without dropping the entire micromodule 6. This provides advantages during installations in multi-floor structures (e.g., high-rise buildings).

Each optical fiber 4 typically has a colored coating. Likewise, the retaining enclosure of each micromodule 6 can also be colored. As will be known to those of ordinary skill in art, such coloring facilitates the identification of the optical fibers 4 within the cable 2 during connection operations.

As noted, the cable 2 has a ribbon-like jacket 8. The ribbon shape of the cable 2 facilitates access to all the micromodules 6 and permits easier opening of the cable jacket 8.

The cable jacket 8 is extruded over the micromodules 6, the jacket 8 contacting each micromodule 6. This way each micromodule 6 is mechanically coupled to a cable jacket 8 along the length of the cable 2 (e.g., frictionally coupled and/or melt bonded). As a result, the micromodule 6 cannot significantly slip or slide with respect to the jacket 8 and, therefore, cannot sag within the cable 2. Indeed, as the micromodules 6 are coupled to the cable jacket 8, the micromodules 6 cannot be readily extracted during a dropping operation. As such, the optical fibers 4 alone are extracted from the cable 2.

The cable jacket 8 can be formed, for example, from halogen-free, flame-retardant (HFFR) materials or polyvinyl chloride (PVC). These materials are compatible with the existing standards for inside uses (e.g., fire standards), and can be extruded to form the cable jacket 8. Moreover, these materials also allow for easy cutting with scissors or other cutter, or tearing by hand.

The cable 2 can also include two reinforcing elements 10 longitudinally arranged in the cable jacket 8, typically at opposite edges of the cable 2 as depicted in FIG. 1 (i.e., on both outermost sides of the array of micromodules 6). These reinforcing elements 10 (i.e., strength members) can include glass-reinforced plastic (GRP) rods, stranded or single-stranded galvanized steel rods, plastic rods reinforced with aramid fibers, or any other appropriate reinforcing element capable of stiffening the cable 2. The reinforcing elements 10 are therefore rigid reinforcements, which make it possible to support the weight of the cable 2 during the installation operations and thereafter during vertical deployments. The reinforced cable 2 limits tension applied to the fibers 4.

As noted, the reinforcing elements 10 can be placed on each side of the sheet of micromodules 6. This allows better distribution of the forces exerted by the weight of the cable 2. The diameter of the jacket 8 around the reinforcing elements 10 can be greater than the thickness of the cable 2 in the central region of the micromodules 6. This also reduces crushing stresses being applied directly to the micromodules 6 (i.e., such crushing stresses are first applied to the reinforcing elements 10).

In the exemplary cable 2 depicted in FIG. 1, the height (H) of the cable 2, defined as the diameter of the jacket 8 surrounding the reinforcing elements 10, is approximately 2.5 millimeters. The width (L) of the cable 2, defined as the width between the two reinforcing elements 10, is approximately 18 millimeters.

Figures 2A, 2B:
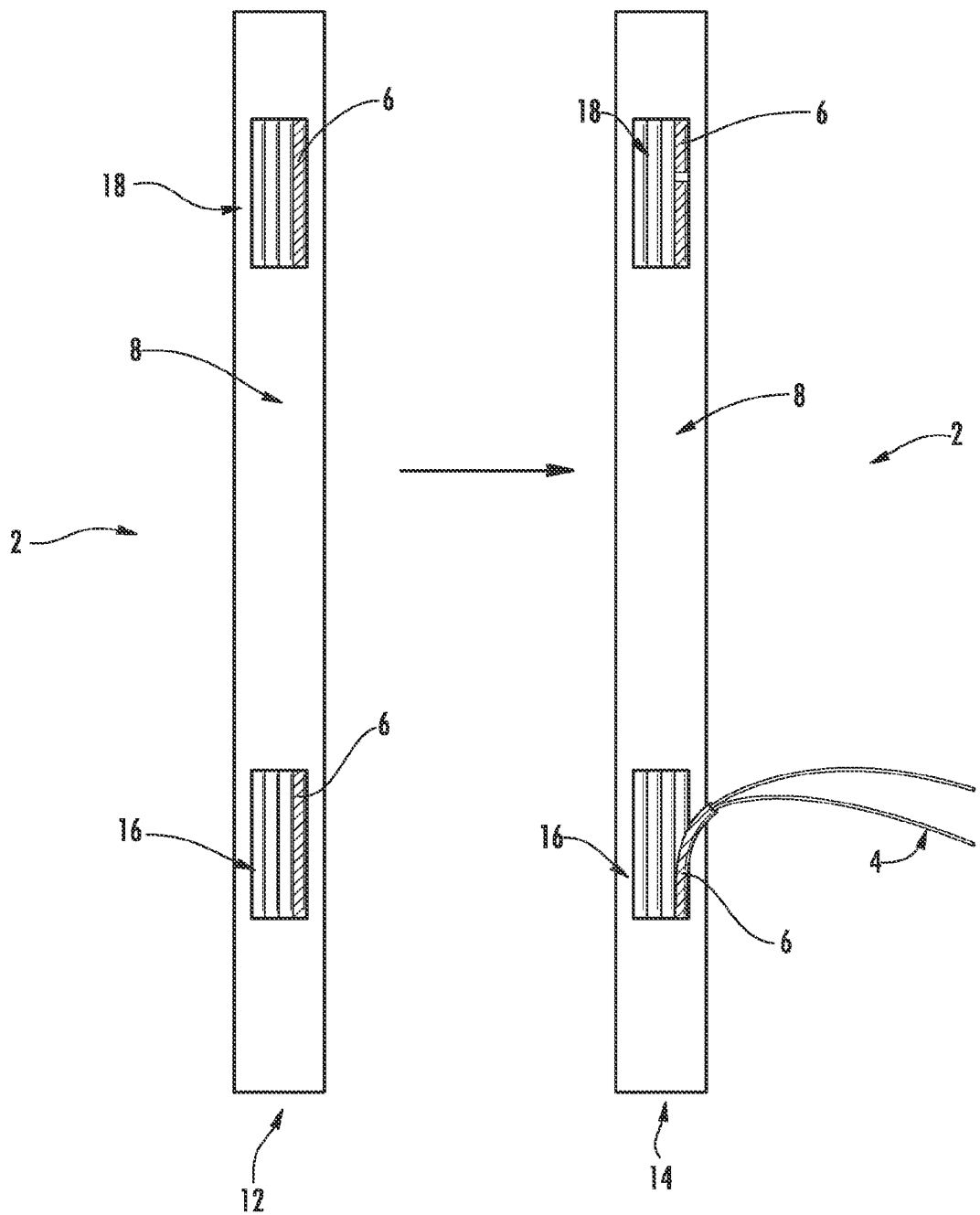
FIG. 2a and FIG. 2b schematically depict an extraction method according to the present invention.

In another aspect, the invention embraces an improved optical-fiber extraction method. FIG. 2a and FIG. 2b schematically depict a sequential dropping procedure for extracting the optical fibers 4 from a cut micromodule 6 of the cable 2. It will be understood that FIG. 2a and FIG. 2b depict the same cable 2 at different points in time during a dropping procedure in which the incoming signal comes from below.

As illustrated in FIG. 2a, the initial step 12 requires two openings 16 and 18 to be made in the jacket 8 of a vertically oriented cable 2. The first opening 18 is formed above the second opening 16. The openings 16 and 18 can be made manually using a cutting tool, such as scissors or a cutter. The height dimension of the openings 16 and 18 are typically less than 10 centimeters. The respective openings 16 and 18 are spaced apart by approximately 3 to 5 meters, which corresponds to the distance between adjacent floors when the cable 2 is installed in a building.

Within each of the openings 16 and 18, a micromodule 6 is easily identifiable by color.

As illustrated in FIG. 2b, in the sequential step 14, through the first opening 18, a micromodule 6 is cut. It is also possible to open the micromodule 6, such as by hand tearing its retaining enclosure. The optical fibers 4 within the micromodule 6 are then cut. Like the micromodule 6, the optical fibers 4 are also color-coded for easy identification.

Then, through the second opening 16, the same micromodule 6 is opened and the previously cut optical fibers 4 are pulled out. The micromodule 6 itself, however, remains in the cable 2 as it is coupled with the cable jacket 8 (e.g., via friction). Sagging of the micromodule 6 within the cable 2 is prevented, which in turn limits tension upon the optical fibers 4.

The optical fibers 4 are then pulled out from the second opening 16 over a distance corresponding to the distance between first opening 18 and second opening 16. As noted, this typically ranges between about three and five meters. The greasy component applied between the optical fibers 4 allows such an extraction over this distance with limited mechanical stresses. The dropped optical fibers 4 are then degreased and stored in a dropping box.

The present cable 2 is particularly suitable for use as an inside cable. In particular, the cable 2 can be installed substantially vertically.

In the case of a building having several floors, to drop the fibers 4 at a floor n−1, the first opening 18 can be made at the above adjacent floor n and the second opening 16 can be made at the floor n−1. At the first opening 18, the jacket 8 of the cable 2 is opened, the enclosure of a micromodule 6 is opened, and the optical fibers 4 of the micromodule 6 are cut. At the second opening 16, the jacket 8 of the cable 2 is opened, the enclosure of the micromodule 6 is opened, and the cut optical fibers 4 are extracted.

Advantageously, to connect the floor n, the first opening 18, which has been used for cutting the optical fibers 4 for dropping at the below adjacent floor n−1, can serve as an extraction opening for the optical fibers in second micromodule. To achieve this, an opening is made in the cable jacket at the above adjacent floor n+1, and a second micromodule is accessed and its optical fibers cut (not shown). Then, these cut optical fibers can be extracted from first opening 18 at floor n. In this way, the number of cut windows is limited, and cable 2 is not unnecessarily weakened.

Those having ordinary skill in the art will appreciate that, if the incoming signal comes from above, the openings in the vertical cable are accessed so that the dropped optical fibers are extracted from the opening made above.

In sum, the cable 2 with optical-fiber micromodules 6 the associated method for extracting optical fibers 4 from the cable 2 solve the problem of sagging micromodules in vertical cable installations.

This application incorporates entirely by reference the following commonly assigned patent application publication and patent application: International Patent Application Publication No. WO 2009/062131 A1 for Microbend-Resistant Optical Fiber, (Overton); and U.S. patent application Ser. No. 12/267,732 for a Microbend-Resistant Optical Fiber.

This application further incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Patent Application Publication No. US2007/0127878 A1 for a Single Mode Optical Fiber (de Montmorillon et al.); U.S. Patent Application Publication No. US2007/0280615 A1 for a Single-Mode Optical Fiber (de Montmorillon et al.); U.S. Pat. No. 7,356,234 for Chromatic Dispersion Compensating Fiber (de Montmorillon et al.); U.S. Pat. No. 7,483,613 for Chromatic Dispersion Compensating Fiber (de Montmorillon et al.); U.S. Patent Application Publication No. US2008/0152288 A1 for an Optical Fiber (Flammer et al.); U.S. patent application Ser. No. 12/098,804 for Transmission Optical Fiber Having Large Effective Area (Sillard et al.); U.S. patent application Ser. No. 12/418,523 for Dispersion-Shifted Optical Fiber (Sillard et al.); U.S. patent application Ser. No. 12/436,423 for a Single-Mode Optical Fiber Having Reduced Bending Losses, (de Montmorillon et al.); and U.S. patent application Ser. No. 12/436,484 for a Bend-Insensitive Single-Mode Optical Fiber, (de Montmorillon et al.).

This application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for Optical Unit for Fiber Optic Cables; U.S. Pat. No. 6,066,397 for Polypropylene Filler Rods for Optical Fiber Communications Cables; U.S. Pat. No. 6,175,677 for Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for Method for Accessing Optical Fibers in the Midspan Region of an Optical Fiber Cable; U.S. Pat. No. 6,381,390 for Color-Coded Optical Fiber Ribbon and Die for Making the Same; U.S. Pat. No. 6,181,857 for Method for Accessing Optical Fibers Contained in a Sheath; U.S. Pat. No. 6,314,224 for Thick-Walled Cable Jacket with Non-Circular Cavity Cross Section; U.S. Pat. No. 6,334,016 for Optical Fiber Ribbon Matrix Material Having Optimal Handling Characteristics; U.S. Pat. No. 6,321,012 for Optical Fiber Having Water Swellable Material for Identifying Grouping of Fiber Groups; U.S. Pat. No. 6,321,014 for Method for Manufacturing Optical Fiber Ribbon; U.S. Pat. No. 6,210,802 for Polypropylene Filler Rods for Optical Fiber Communications Cables; U.S. Pat. No. 6,493,491 for Optical Drop Cable for Aerial Installation; U.S. Pat. No. 7,346,244 for Coated Central Strength Member for Fiber Optic Cables with Reduced Shrinkage; U.S. Pat. No.

6,658,184 for Protective Skin for Optical Fibers; U.S. Pat. No. 6,603,908 for Buffer Tube that Results in Easy Access to and Low Attenuation of Fibers Disposed Within Buffer Tube; U.S. Pat. No. 7,045,010 for Applicator for High-Speed Gel Buffering of Flextube Optical Fiber Bundles; U.S. Pat. No. 6,749,446 for Optical Fiber Cable with Cushion Members Protecting Optical Fiber Ribbon Stack; U.S. Pat. No. 6,922,515 for Method and Apparatus to Reduce Variation of Excess Fiber Length in Buffer Tubes of Fiber Optic Cables; U.S. Pat. No. 6,618,538 for Method and Apparatus to Reduce Variation of Excess Fiber Length in Buffer Tubes of Fiber Optic Cables; U.S. Pat. No. 7,322,122 for Method and Apparatus for Curing a Fiber Having at Least Two Fiber Coating Curing Stages; U.S. Pat. No. 6,912,347 for Optimized Fiber Optic Cable Suitable for Microduct Blown Installation; U.S. Pat. No. 6,941,049 for Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); International Patent Application Publication No. WO 2007/013923 A2 for Grease-Free Buffer Optical Fiber Buffer Tube Construction Utilizing a Water-Swellable, Texturized Yarn (Overton et al.); European Patent Application Publication No. 1,921,478 A1 for a Telecommunication Optical Fiber Cable (Tatat et al.); U.S. Patent Application Publication No. US2007/0183726 A1 for an Optical Fiber Cable Suited for Blown Installation or Pushing Installation in Microducts of Small Diameter (Nothofer et al.); U.S. Patent Application Publication No. US 2008/0037942 A1 for an Optical Fiber Telecommunications Cable (Tatat); U.S. Patent Application Publication No. US2008/0145010 A1 for a Gel-Free Buffer Tube with Adhesively Coupled Optical Element (Overton et al.); U.S. Patent Application Publication No. US2008/0181564 A1 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Patent Application Publication No. US2009/0003781 A1 for an Optical Fiber Cable Having a Deformable Coupling Element (Parris et al.); U.S. Patent Application Publication No. US2009/0003779 A1 for an Optical Fiber Cable Having Raised Coupling Supports (Parris); U.S. Patent Application Publication No. US2009/0003785 A1 for a Coupling Composition for Optical Fiber Cables (Parris et al.); U.S. patent application Ser. No. 12/391,327 for a Buffer Tube with Hollow Channels, (Lookadoo et al.)

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. An optical fiber telecommunication cable (2), comprising:
   a plurality of micromodules (6) arranged in parallel and in a plane, each of the micromodules comprising a thin, flexible, and hand-tearable retaining enclosure surrounding a plurality of optical fibers (4) and a greasy component applied between the optical fibers (4),
   a cable jacket (8) tightly extruded over the plurality of micromodules (6) so that the retaining enclosures of the plurality of micromodules (6) are frictionally coupled and/or melt bonded to the cable jacket (8), and so that there is substantially no clearance between the cable jacket (8) and each micromodule (6) along the length of the cable jacket (8); and
   two rigid strength members (10) enclosed within said cable jacket (8), wherein said plurality of micromodules (6) are positioned in a central region of said cable jacket (8) between said respective strength members (10), and wherein the height of said cable jacket (8) around said rigid strength members (10) is greater than the height of the central region of said cable jacket (8) around said micromodules (6).

2. A cable (2) according to claim 1, wherein the cable jacket (8) comprises halogen-free flame-retardant (HFFR) materials and/or polyvinyl chloride (PVC).

3. A cable (2) according to claim 1, wherein the greasy component comprises synthetic and/or mineral oil-based filling gels.

4. A method for dropping optical fibers from a cable (2) according to claim 1, the method comprising:
   making a first opening (18) in the cable jacket (8), tearing or otherwise opening the retaining enclosure of a micromodule (6) through the first opening (18), and cutting the optical fibers (4) positioned within the retaining enclosure of the micromodule (6) through the first opening (18); and
   making a second opening (16) in the cable jacket (8), tearing or otherwise opening the retaining enclosure of the micromodule (6) through the second opening (16), and extracting the cut optical fibers (4) through the second opening (16).

5. A method for dropping optical fibers from a cable (2) according to claim 4, wherein the cable (2) is installed substantially vertically.

6. A method for dropping optical fibers from a cable (2) according to claim 5, wherein the cable (2) is installed in a building having at least two floors, wherein the first opening (18) is made at a first floor (n) and the second opening (16) is made at an adjacent lower floor (n−1).

7. A method for dropping optical fibers from a cable (2) according to claim 6, wherein the cable (2) is installed in a building having at least three floors, wherein optical fibers previously cut at a floor (n+1) located adjacent to and above floor (n) are extracted from the first opening (18).

8. A cable (2) according to claim 1, wherein at least one of the retaining enclosures of the plurality of micromodules (6) is frictionally coupled to the cable jacket (8).

9. A cable (2) according to claim 1, wherein at least one of the retaining enclosures of the plurality of micromodules (6) is melt bonded to the cable jacket (8).

10. A cable (2) according to claim 1, wherein the retaining enclosures of the plurality of micromodules (6) are sufficiently coupled to the cable jacket (8) to preclude significant slippage of the plurality of micromodules (6) within the cable jacket (8) when the cable (2) is vertically deployed.

11. An optical fiber cable (2), comprising:
   a plurality of micromodules (6), each said micromodule (6) having a flexible and hand-tearable micromodule sheath enclosing a plurality of optical fibers (4), wherein said micromodules (6) are arranged substantially planar in parallel;
   a cable jacket (8) tightly extruded over said plurality of micromodules (6) so that there is substantially no clearance between said cable jacket (8) and each micromodule (6) along the length of said cable jacket (8), said micromodule sheaths being sufficiently coupled to said cable jacket (8) to preclude significant slippage of said micromodules (6) within said cable jacket (8) when the optical fiber cable (2) is vertically deployed; and two rigid strength members (10) enclosed within said cable jacket (8), wherein said plurality of micromodules (6) are positioned in a central region of said cable jacket (8) between said respective strength members (10), and wherein the height of said cable jacket (8) around said rigid strength members (10) is greater than the height of the central region of said cable jacket (8) around said micromodules (6).

12. An optical fiber cable (2) according to claim 11, further comprising two rigid strength members (10) enclosed within said cable jacket (8), wherein said plurality of micromodules (6) are positioned between said respective strength members (10) within the optical fiber cable (2).

13. An optical fiber cable (2) according to claim 11, further comprising a filling gel within each said micromodule (6).

14. An optical fiber cable (2) according to claim 11, wherein said micromodule sheaths are frictionally coupled to said cable jacket (8).

15. An optical fiber cable (2) according to claim 14, wherein at least one of said micromodule sheaths is melt bonded to said cable jacket (8).

16. An optical fiber cable (2) according to claim 11, wherein at least one of said micromodule sheaths is melt bonded to said cable jacket (8).

17. A method for dropping optical fibers from a cable (2), the method comprising:

providing a cable (2) that includes:

a plurality of micromodules (6), each micromodule (6) having a flexible and hand-tearable micromodule sheath enclosing a plurality of optical fibers (4), wherein the micromodules (6) are arranged substantially planar in parallel;

a cable jacket (8) tightly extruded over the plurality of micromodules (6) so that there is substantially no clearance between the cable jacket (8) and each micromodule (6) along the length of the cable jacket (8), the micromodule sheaths being sufficiently coupled to the cable jacket (8) to preclude significant slippage of the micromodules (6) within the cable jacket (8) when the optical fiber cable (2) is vertically deployed; and two rigid strength members (10) enclosed within the cable jacket (8), wherein the plurality of micromodules (6) are positioned in a central region of the cable jacket (8) between the respective strength members (10), and wherein the height of the cable jacket (8) around the rigid strength members (10) is greater than the height of the central region of the cable jacket (8) around the micromodules (6);

making a first opening (18) in the cable jacket (8), tearing or otherwise opening the retaining enclosure of a micromodule (6) through the first opening (18), and cutting the optical fibers (4) positioned within the sheath of the micromodule (6) through the first opening (18); and making a second opening (16) in the cable jacket (8), tearing or otherwise opening the sheath of the micromodule (6) through the second opening (16), and extracting the cut optical fibers (4) through the second opening (16).

18. A method according to claim 17, wherein the cable (2) is installed substantially vertically.

19. A method according to claim 18, wherein the cable (2) is installed in a building having at least two floors, wherein the first opening (18) is made at a first floor (n) and the second opening (16) is made at an adjacent lower floor (n−1).

20. A method according to claim 19, wherein the cable (2) is installed in a building having at least three floors, wherein optical fibers previously cut at a floor (n+1) located adjacent to and above floor (n) are extracted from the first opening (18).

* * * * *